(12) United States Patent
Hinson

(10) Patent No.: US 8,261,179 B2
(45) Date of Patent: Sep. 4, 2012

(54) WEB PAGE HOT SPOTS

(75) Inventor: David Hinson, Freeport, ME (US)

(73) Assignee: Benevoltek, Inc., Portland, ME (US)

( * ) Notice: Subject to any disclaimer, the term of this patent is extended or adjusted under 35 U.S.C. 154(b) by 286 days.

(21) Appl. No.: 12/504,497

(22) Filed: Jul. 16, 2009

(65) Prior Publication Data

US 2011/0016376 A1 Jan. 20, 2011

(51) Int. Cl.
*G06F 17/00* (2006.01)
(52) U.S. Cl. ........ 715/207; 715/205; 715/206; 715/208; 715/246; 715/247
(58) Field of Classification Search .................. 715/200, 715/205, 206, 207, 208, 243, 246, 247
See application file for complete search history.

(56) References Cited

U.S. PATENT DOCUMENTS

| | | | |
|---|---|---|---|
| 6,721,952 B1 * | 4/2004 | Guedalia et al. | 725/38 |
| 6,822,663 B2 * | 11/2004 | Wang et al. | 715/854 |
| 6,978,418 B1 | 12/2005 | Bain et al. | |
| 7,203,361 B1 * | 4/2007 | Meier | 382/173 |
| 7,460,130 B2 * | 12/2008 | Salganicoff | 345/590 |
| 7,471,828 B1 * | 12/2008 | Meier | 382/173 |
| 7,522,774 B2 * | 4/2009 | Ramasastry et al. | 382/232 |
| 7,724,925 B2 * | 5/2010 | Shepard | 382/115 |
| 7,899,915 B2 * | 3/2011 | Reisman | 709/228 |
| 7,987,491 B2 * | 7/2011 | Reisman | 725/112 |
| 2001/0051881 A1 * | 12/2001 | Filler | 705/3 |
| 2002/0035579 A1 * | 3/2002 | Wang et al. | 707/513 |
| 2002/0126990 A1 | 9/2002 | Rasmussen et al. | |
| 2003/0149983 A1 | 8/2003 | Markel | |
| 2005/0066286 A1 * | 3/2005 | Makela | 715/764 |
| 2005/0149878 A1 * | 7/2005 | White et al. | 715/784 |
| 2006/0062362 A1 * | 3/2006 | Davis | 379/100.13 |
| 2007/0047781 A1 | 3/2007 | Hull et al. | |
| 2007/0130501 A1 | 6/2007 | Michaud | |
| 2007/0201761 A1 | 8/2007 | Lueck | |

(Continued)

FOREIGN PATENT DOCUMENTS

KR 10-2009-0015628 A 2/2009

(Continued)

OTHER PUBLICATIONS

Nolan Hester, Creating a Web Site in Dreamweaver CS3: Visual QuickProject Guide, Jun. 21, 2007, Peachpit Press, pp. 59-75 and 117-119.*

Metanet NReality Nexx's Image Map Tutorial, http://metanet.2.forumer.com/a/nexx39s-image-map-tutorial_post21904.html, Mar. 19, 2008.

(Continued)

*Primary Examiner* — Stephen Hong
*Assistant Examiner* — Gregory J Vaughn
(74) *Attorney, Agent, or Firm* — Robert Plotkin, P.C.

(57) ABSTRACT

An image map designer creates an image map for use with an image. The image map contains one or more hotspots, each of which specifies a set of pixels which may be non-contiguous and non-polygonal. The image map designer may create the image map using image processing software that facilitates creation of non-contiguous and non-polygonal image maps. Multiple versions of the image map may be created, each for use with a different magnification of the image. The image maps are stored in a compact format, which may be transmitted efficiently from a server to a client. Data contained within the image map facilitates the process of determining whether the client user's mouse pointer is within any of the hotspots, and the process of applying the image map to the image when rendered at different magnifications.

23 Claims, 8 Drawing Sheets

U.S. PATENT DOCUMENTS

| | | | |
|---|---|---|---|
| 2008/0141120 A1* | 6/2008 | White et al. | 715/252 |
| 2008/0141325 A1* | 6/2008 | Ludvig et al. | 725/116 |
| 2008/0184163 A1* | 7/2008 | White et al. | 715/798 |
| 2009/0263030 A1* | 10/2009 | Ramasastry et al. | 382/232 |
| 2010/0283853 A1* | 11/2010 | Acree | 348/144 |

FOREIGN PATENT DOCUMENTS

| | | | |
|---|---|---|---|
| WO | 0079799 A2 | 12/2000 | |

OTHER PUBLICATIONS

Price, et al., "Object-based Vectorization for Interactive Image Editing", Visual Computer, Proceedings of Pacific Graphics, vol. 22, No. 9-11, Sep. 2006, pp. 1-9.

Seiller, Steven, "Image Maps: Creating a Client-side Image Map with Dreamweaver", Community MX, 2002-2008, 3 pages.

* cited by examiner

WEB PAGE HOT SPOTS

BACKGROUND

It is common for software and web sites to present the user with an image, such as a map of the United States, and to allow the user to select a region of the image, such as a particular state, by clicking on the image region. In response, the software or web site may perform an action related to the selected region, such as displaying additional information about the state illustrated by the selected region.

Such functionality is often provided using an "image map," which defines an outline of each of the regions within the image which may be selected by the user. In the example above, the image map would include, for each state, a set of coordinates defining the vertices of a polygon which form the outline of the state. Each such polygon defines a "hotspot" within the image which may be selected by the user to select the corresponding state. Associated with each hotspot may be instructions defining the action to be taken in response to the user's selection of the hotspot. Such instructions may, for example, take the form of a hyperlink to a location containing more information about the corresponding state.

The intent of an image map is to enable multiple regions (hotspots) within a single image to be linkable to different locations (or to trigger other actions) without requiring the image to be divided into separate image files. This simplifies the process of creating user-friendly web pages containing multiple hotspots within a single image.

Existing languages for defining web pages, such as HTML and XHTML, contain mechanisms for implementing image maps in the manner described above. Existing techniques for creating an image map containing multiple hotspots, however, tend to be tedious, time-consuming, and prone to error. For example, it is possible to create an image map by writing the necessary HTML code manually using a text editor, but defining each vertex of each hotspot in an image is a painstaking process. As a result, most image maps which are created by hand-coding tend to consist of hotspots which are simple polygons, such as rectangles and trapezoids, and which therefore may not correspond very accurately to the image regions they are intended to overlap. Consider, for example, attempting to code by hand a hotspot for an irregularly-shaped state such as Florida using only simple polygons.

As a result, software tools exist which facilitate the process of creating image maps by drawing hotspots within them. Although such tools represent an improvement over hand-coding, the process of creating a polygon that forms the precise outline of an irregular shape can still be tedious, time-consuming, and error prone. Creating a large number of such hotspots within a single image can be particularly time-consuming. As a result, users are still often faced with image maps containing hotspots that only roughly correspond to the image regions they are intended to represent.

What is needed, therefore, are improved techniques for implementing hotspots in web pages and in software more generally.

SUMMARY

An image map designer creates an image map for use with an image. The image map contains one or more hotspots, each of which specifies a set of pixels which may be non-contiguous and non-polygonal. The image map designer may create the image map using image processing software that facilitates creation of non-contiguous and non-polygonal image maps. Multiple versions of the image map may be created, each for use with a different magnification of the image. The image maps are stored in a compact format, which may be transmitted efficiently from a server to a client. Data contained within the image map facilitates the process of determining whether the client user's mouse pointer is within any of the hotspots, and the process of applying the image map to the image when rendered at different magnifications.

One embodiment of the present invention is directed to a computer-implemented method comprising: (A) receiving a first instruction from a first user to select a first portion of a first digital image, the first digital image comprising a plurality of pixels; (B) in response to the first instruction, selecting a first subset of the plurality of pixels in the first digital image; (C) storing a record of the first subset in an image map collection data structure; (D) transmitting the image map collection data structure and the first digital image to a client; (E) identifying a current location of a user cursor within a rendering of the first digital image at the client; (F) determining whether the current location is within the first subset; and (G) if the current location is within the first subset, taking a first predetermined action associated with the first subset.

Other features and advantages of various aspects and embodiments of the present invention will become apparent from the following description and from the claims.

DETAILED DESCRIPTION

Figure 1:
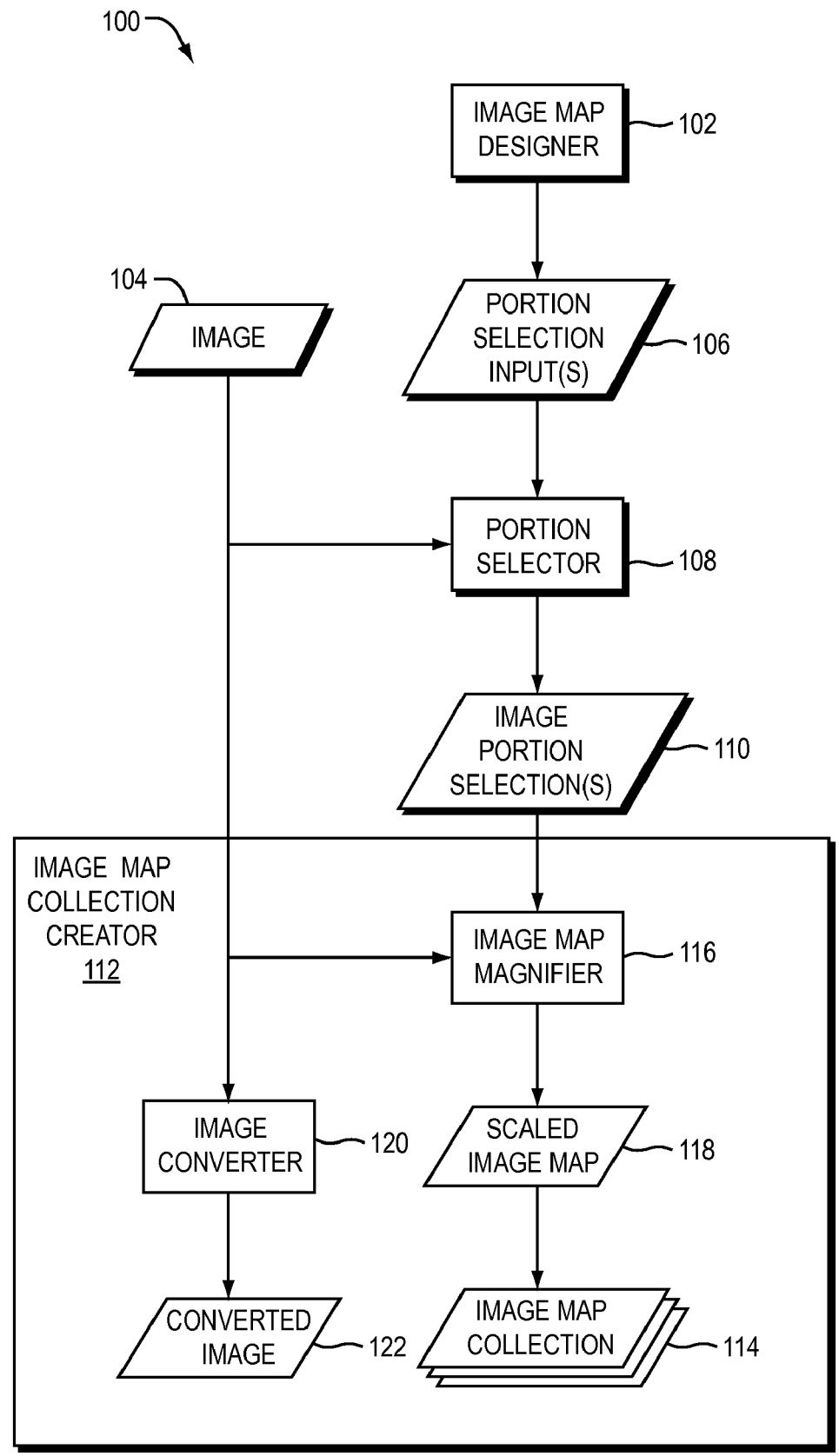
FIG. 1 is a dataflow diagram of a system for creating one or more image maps according to one embodiment of the present invention.
Figure 2:
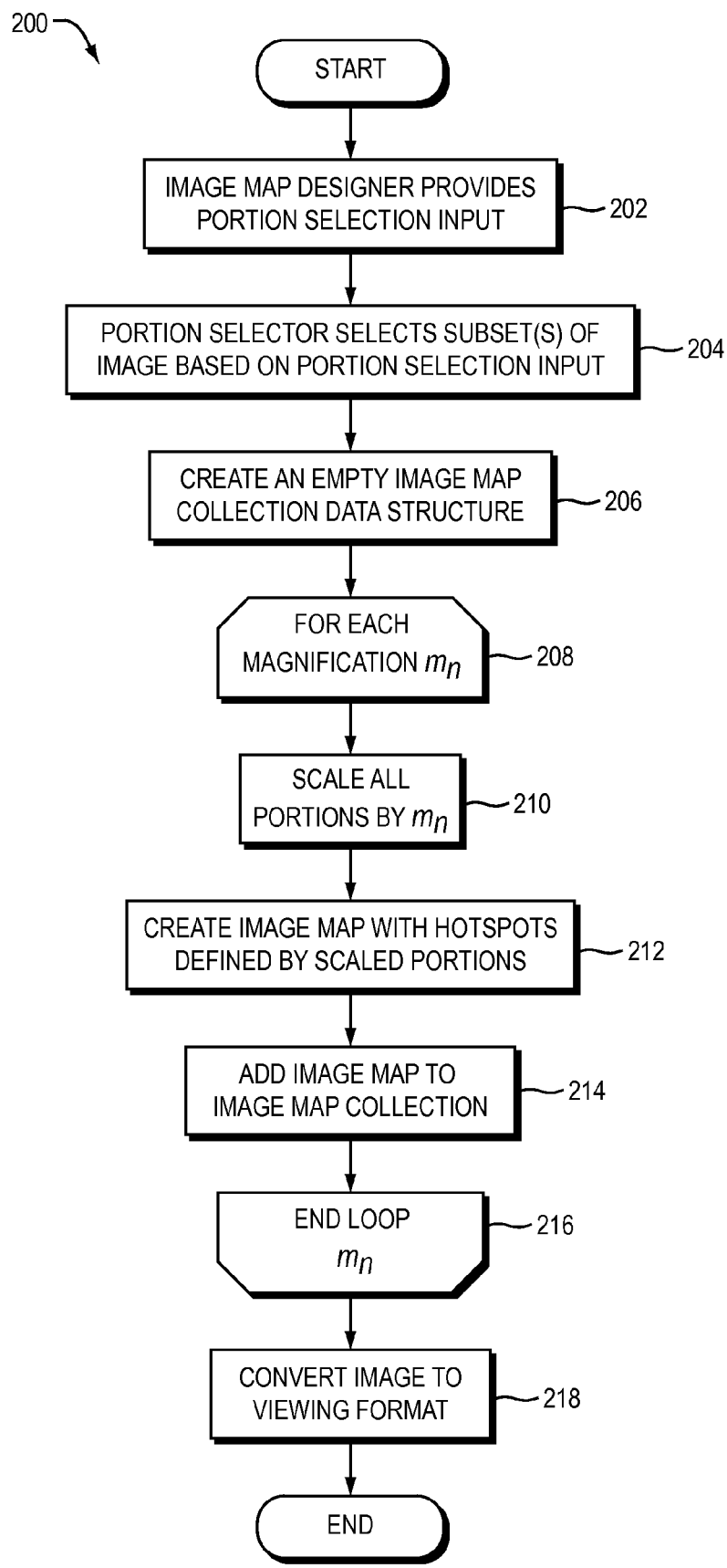
FIG. 2 is a flowchart of a method performed by the system of FIG. 1 according to one embodiment of the present invention.

Techniques for creating and using image maps according to various embodiments of the present invention will now be described. Referring to FIG. 1, a dataflow diagram is shown of a system 100 for creating one or more image maps according to one embodiment of the present invention. Referring to FIG. 2, a flowchart is shown of a method 200 performed by the system of FIG. 1 according to one embodiment of the present invention.

A user 102, referred to in FIG. 1 as an "image map designer," provides input 106 selecting one or more portions of an image 104 (FIG. 2, step 202). The image map designer 102 may provide the input 106 in any of a variety of ways. For example, the image map designer 102 may use image processing software, such as Adobe Photoshop, to select one or more portions of the image. Such software includes a variety of tools for selecting portions of an image. Any such tools may be used by the image map designer 102 to select portions of the image 104. For example, the image map designer 102 may use a rectangle selection tool to select a rectangular portion of the image 104, an ellipse selection tool to select an elliptical portion of the image, a color selection tool to select all pixels having a particular color or range of colors, a pixel selection tool to select one or more pixels within the image 104, or a "magic wand" selection tool to select all contiguous pixels having the same color or range of colors starting from the location of the mouse pointer.

As the "magic wand" example illustrates, the image map designer 102 may select a portion of the image 104 representing an object within the image without specifying the shape of the object. For example, if the image 104 contains a sofa, the image map designer 102 may click on a pixel within the sofa using the "magic wand" tool, thereby causing the portion selector 108 to select some or all of the pixels representing the sofa, but without requiring the designer 102 to draw a polygon representing the outline of the sofa, or to otherwise specify the outline of the sofa. Such techniques may greatly simplify the process of selecting objects within the image 104 having complex shapes and thereby greatly simplify the process of creating hotspots for such objects.

This method of selecting the portion(s) is shown in FIG. 1, in which the image map designer 102 provides portion selection input(s) 106 to a portion selector 108, in response to which the portion selector 108 outputs one or more image portion selection data structures 110 representing the selected image portion(s) (FIG. 2, step 204). The portion selector 108 may, for example, be part of standard image processing software as described above. The image portion selection data structure(s) 110 may take any form, such as data structures internal to the portion selector 108.

Furthermore, the set of pixels corresponding to a particular image portion may be represented within the corresponding image portion data structure in any of a variety of ways. For example, a set of image portion pixels may be represented within the image portion selections 110 as a list or array of pixels, which may be compressed or uncompressed.

The image map designer 102 may select the image portion(s) in other ways, such as by issuing text-based commands, or by writing code defining the image portion(s). Any of the techniques described above for selecting the image portion(s) may be combined with each other and with other techniques.

As the examples just provided indicate, there may be any of a variety of relationships between the input 106 provided by the image map designer 102 and the resulting image portion selections 110, as a result of various types of processing which the portion selector 108 may apply to the designer's input 106 to produce the image portion selections 110. For example, the designer's input 106 may specify the coordinates of a polygon, in response to which the portion selector 108 may generate portion selections 110 representing the set of pixels within the specified polygon. As another example, the designer's input 106 may directly specify one or more of the pixels to be contained within the image portion selections 110.

Note that a single "portion" of the image need not consist solely of a contiguous region within the image 104. Rather, the term "portion" as used herein may refer to any subset, whether contiguous or non-contiguous, of the image 104. For example, if the image 104 is a rasterized image, a single "portion" of the image 104 selected by the image map designer 102 may consist of any subset of the pixels within the image, whether or not such pixels are contiguous.

The image 104 may be any kind of image stored in any format. For example, it may be a rasterized image stored in a format such as JPEG or GIF, or a vectorized image. Each pixel in the image 104 may have any number of bits. The portion selector 108 may process the image 104 in its existing format, or may convert the image 104 into other formats to facilitate processing.

As stated above, the image portion selection(s) 110 may include representations of one or more portions of the image 104. Each such portion may be used to create a distinct hotspot within the image 104 when the image 104 is displayed by a web browser within a web page or by other software. One example of a method for creating such hotspots from the image portion selections 110 will now be described.

In the following example, a separate image map is created for each of multiple magnifications of the image 104. This is not, however, a requirement of the present invention. Rather, for example, a single image map for a single magnification (e.g., a magnification of 1.0) of the image 104 may be created.

The system 100 includes an image map collection creator 112, which creates a collection of image maps, one for each desired magnification, for use with the image 104 based on the image portion selections 110. Assume for purposes of example that the image map designer 102 desires to create image maps for each of M different magnifications. The designer 102 may indicate this to the image map collection creator 112 by, for example, providing a list of the magnifications desired by the user (e.g., 0.5, 1.0, and 1.5) or in other ways. As another example, the image map collection creator 112 may apply a set of default magnifications representing commonly-needed magnifications for use with standard display sizes.

The image map collection creator 112 creates an empty image map collection data structure 114 (FIG. 2, step 206) enters a loop over each magnification $m_n$, where $0 \geq n \geq M$ (FIG. 2, step 208). For example, if the three desired magnifications are 0.5, 1.0, and 1.5, then M=3, $m_0$=0.5, $m_1$=1.0, and $m_2$=1.5.

For the current magnification $m_n$, an image map magnifier 116 scales all of the portions 110 by a factor of $m_n$ to produce scaled versions of all of the portions 110 (step 210). The image map collection creator 112 uses the scaled portions to produce a scaled image map 118 containing the scaled portions (step 212). The image map collection creator 112 adds the scaled image map 118 to the image map collection 114 (step 214). The image map collection creator 112 repeats steps 210-214 for the remaining magnifications (step 216). The result is that the image map collection 114 contains M image maps, each of which is scaled according to the corresponding value of $m_n$.

The techniques disclosed above with respect to FIGS. 1 and 2 may be implemented in a variety of ways, examples of which will now be described. It was described above that the portion selector 108 may be used to create the image portion selections 110 based on the designer's input 106. More specifically, when the designer 102 selects a portion of the image 104, the portion selector 108 may create a masking layer within the image 104 which consists of the same pixels as those selected by the designer 102, but in a particular easily-identifiable color, such as red. The portion selector 108 may display the masking layer on top of the image 104 to clearly identify to the designer 102 which portions of the image 104 have already been selected. The portion selector 108 may display the masking layers for all portions 110 simultaneously so that the designer 102 does not re-select any portions which were selected previously.

The masking layers and other "layers" described herein may be implemented using image layers already supported by image processing software such as Adobe Photoshop, but this is not a requirement of the present invention. Rather, such layers may be implemented in other ways which are independent of such image processing software. Furthermore, the "layers" described herein may be implemented using any data structure suitable for representing a set of selected pixels, not only those data structures characterized as image "layers."

For example, if the mask information is represented as layers, they may be saved within the image file 104 itself. As a result, the image file 104 may contain both the original image and the image portion selections 110, in the form of the mask layers. In such a case, the image 104 and image portion selections 110 may both be implemented within a single layered image file. Alternatively, however, the image 104 may be stored in an image file which does not include the image portion selections 110, which may be stored in a separate file, files, or other data structure(s).

The image map collection creator 112 may be triggered manually or automatically. For example, the image map collection creation process represented by steps 206-216 in FIG. 2 may be performed automatically once the image portion selections 110 are created. Alternatively, for example, the image map designer 102 or other user may instruct the image map collection creator 112 to create the image map collection based on the image 104 and the image portion selections 110. For example, if the image 104 and image portion selections 110 are stored within a single layered image file, the designer 102 or other user may use a file selection dialog box or other means to point the image map collection creator to the saved layered image file, in response to which the image map collection creator 112 may create the image map collection 114 using the techniques disclosed above. The user may also provide other input to the image map collection creator 112 at this stage, such as the desired magnification(s), and the filename and path in which to store the image map collection data structure 114.

It was stated above that the image map collection creator 112 received the image 104 as input. The image map collection creator 112 may include an image converter 120, which converts the image 104 from its original format (e.g., Adobe Photoshop) to an image 122 stored in the final format (e.g., JPEG or GIF) in which it is intended to be viewed (FIG. 2, step 218). Note, however, that this conversion is optional; the image 104 may instead be retained in its original format for viewing.

Figure 3:
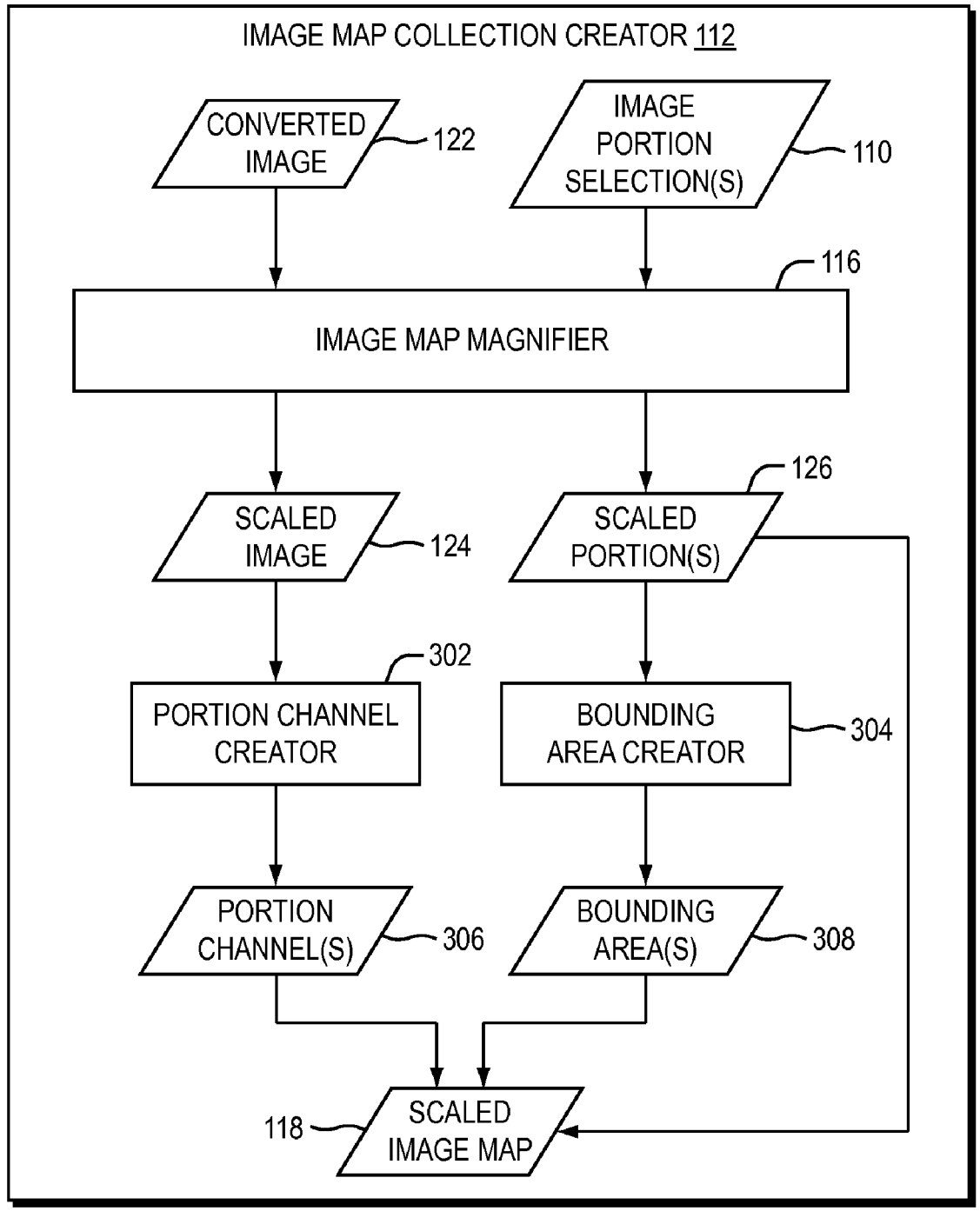
FIG. 3 is a dataflow diagram of a system for generating portion channels and bounding areas for hotspots in image maps according to one embodiment of the present invention.

Additional processing may be performed on each of the image maps in the image map collection. Such processing may, for example, be performed in the manner illustrated by the dataflow diagram of FIG. 3 and the corresponding flowchart of FIG. 4. For ease of illustration, FIG. 3 shows only those portions of the image map collection creator 112 which are relevant to the method 400 illustrated in FIG. 4. Those having ordinary skill in the art will appreciate how to combine the teachings of FIGS. 1 and 2 with the teachings of FIGS. 3 and 4. In particular, FIGS. 3 and 4 only illustrate processing that may be performed for a single magnification. The same techniques may be applied to all desired magnifications.

Figure 4:
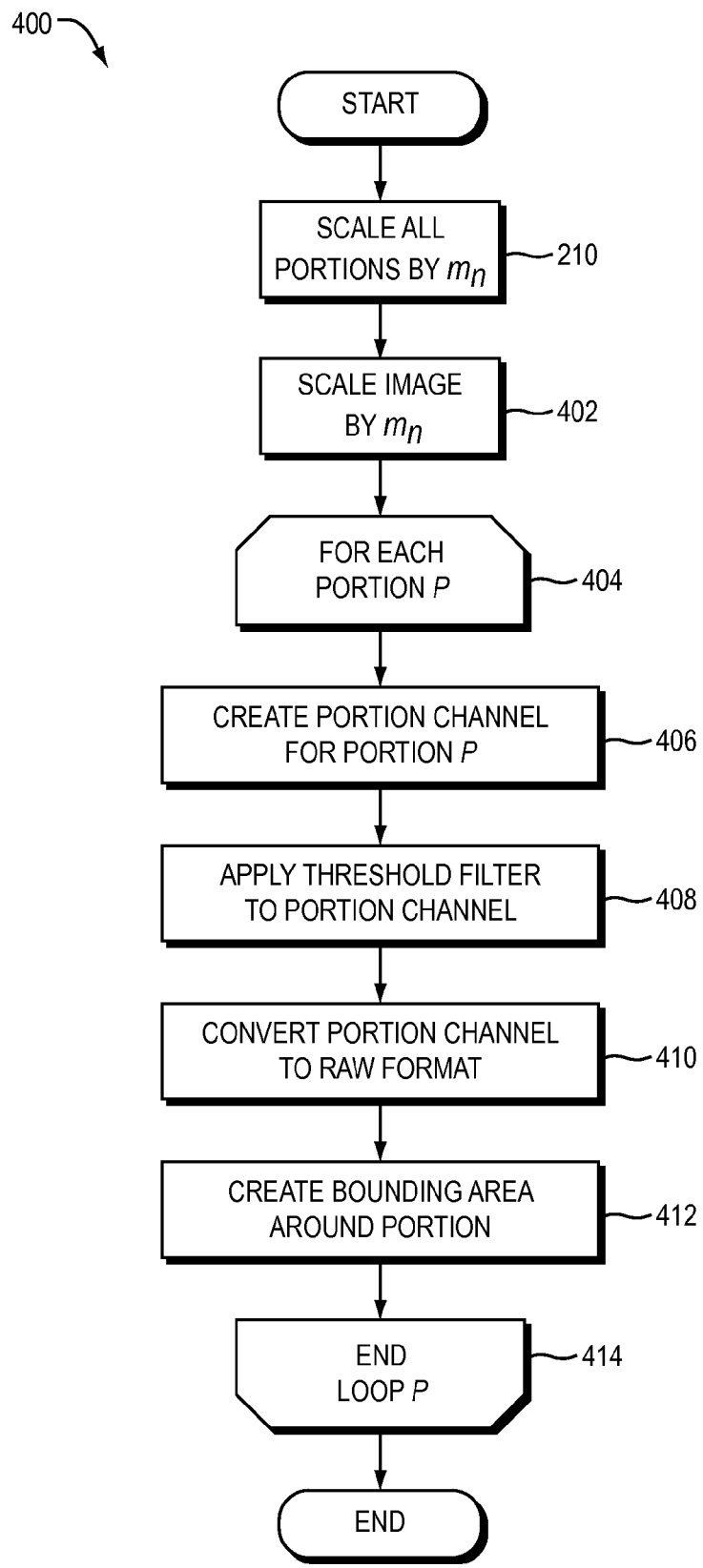
FIG. 4 is a flowchart of a method performed by the system of FIG. 3 according to one embodiment of the present invention.

The image map magnifier 116 scales the selected image portions 110 to produce scaled portions 126, as described above with respect to FIGS. 1 and 2 (FIG. 4, step 210). The image map magnifier 116 also scales the converted image 122 to produce a scaled image 124 (step 402).

If a single layered image file is used to store both the image 104 and the image portion selections 110, the scaling (magnification) process described above with respect to step 210 of FIG. 2 may be performed by scaling all layers of the layered image file. Software such as Adobe Photoshop can perform such scaling on all layers of a layered image file automatically upon instruction. As a result, if the layered image file is stored in Adobe Photoshop format, the image map collection creator 112 may perform step 210 by instructing Adobe Photoshop to scale all layers of the layered image file, including the layers representing the selected image portions 110.

The image map collection creator 112 then enters a loop over each selected portion P (e.g., each layer of the layered image file) (step 404). A portion channel creator 302 creates a "portion channel" 306 corresponding to portion P which has the same width and height as the scaled image 124, but in which the pixels in the portion P are active and in which all other pixels are inactive (step 406).

The portion channel 306 may be implemented in any of a variety of ways, such as by using an alpha channel in Adobe Photoshop within an image separate from the converted image 122, in which pixels with a maximum value (e.g., a value of 255 in the case of 8-bit pixels) play the role of active pixels, and in which pixels with a minimum value (e.g., 0) play the role of inactive pixels. The image map collection creator 112 may apply a threshold filter to the portion channel to force the portion channel to contain only pixels with the applicable minimum and maximum value, such as a filter with a threshold value of 128 (assuming 8-bit pixels) (step 408). Note, however, that step 408 is optional and need not be applied in cases where it is not necessary, such as in cases in which the pixels in the portion channel merely defines pixels as "active" or "inactive," without intermediary values.

The image map collection creator 112 converts the portion channel to a RAW file or other file in which header information has been eliminated (step 410). The dimensions of the image stored in the RAW file may be equal to the dimensions of the corresponding boundary area. The image map collection creator 112 may store the resulting portion channel 306 within the scaled image map 118 along with a link between the portion channel 306 and corresponding scaled portion P 126.

A bounding area creator 304 creates a bounding area data structure 308 defining a bounding area around scaled portion P 126 (step 412). The bounding area data structure 308 may, for example, define a rectangular bounding area defining the smallest rectangle which contains all pixels within scaled portion P 126. The image map collection creator 112 may store the bounding area data structure 308 within the scaled image map 118 along with a link between the bounding area 308 and the corresponding scaled portion P 126. When using Adobe Photoshop, for example, the bounding area data structure 308 may be created by selecting all of the pixels within the portion channel 306, which may be implemented as an Adobe Photoshop alpha channel, and cropping the alpha channel to the smallest rectangle which contains all of the active pixels within the portion channel.

The image map collection creator 112 repeats steps 406-412 for the remaining scaled portions P, thereby creating portion channels and bounding areas for each of the scaled portions P (step 414).

Figure 5:
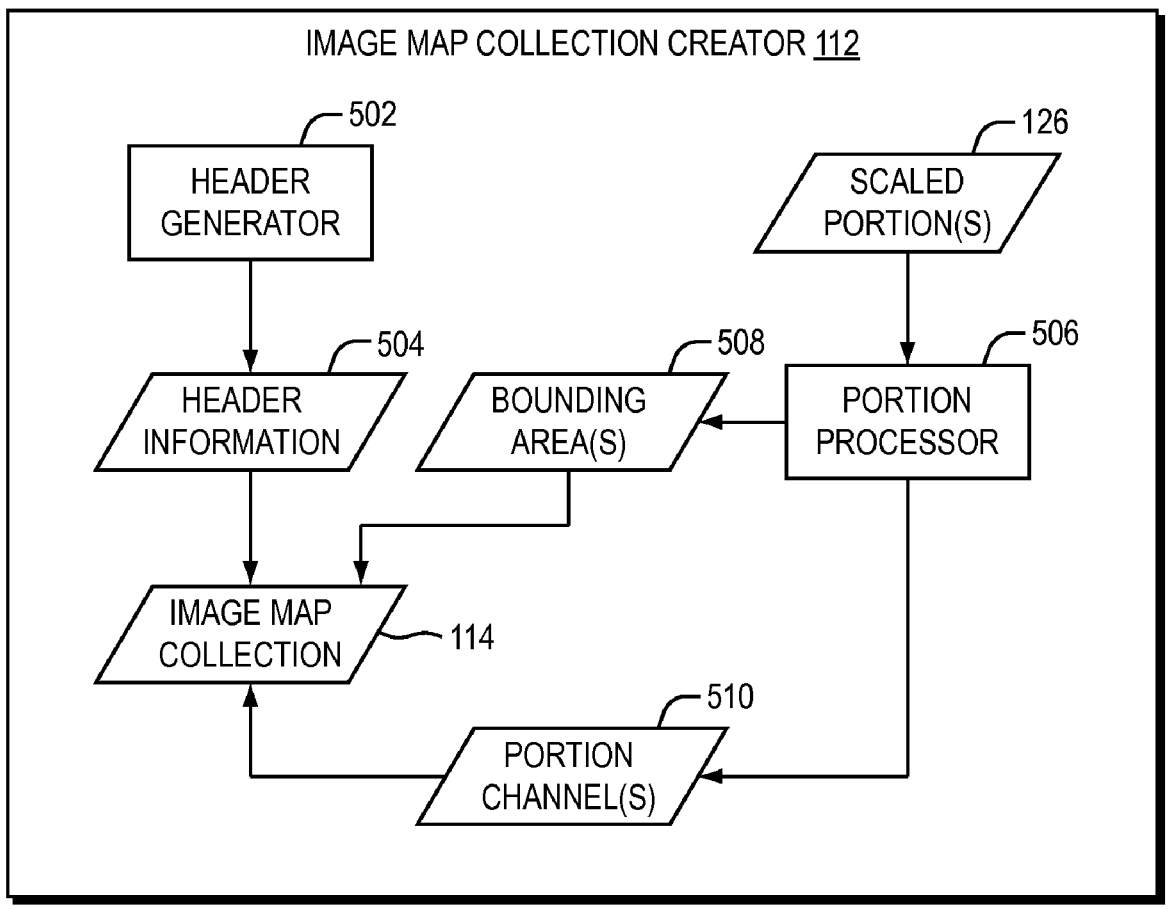
FIG. 5 is a dataflow diagram of a system for creating an image map collection data structure according to one embodiment of the present invention.
Figure 6:
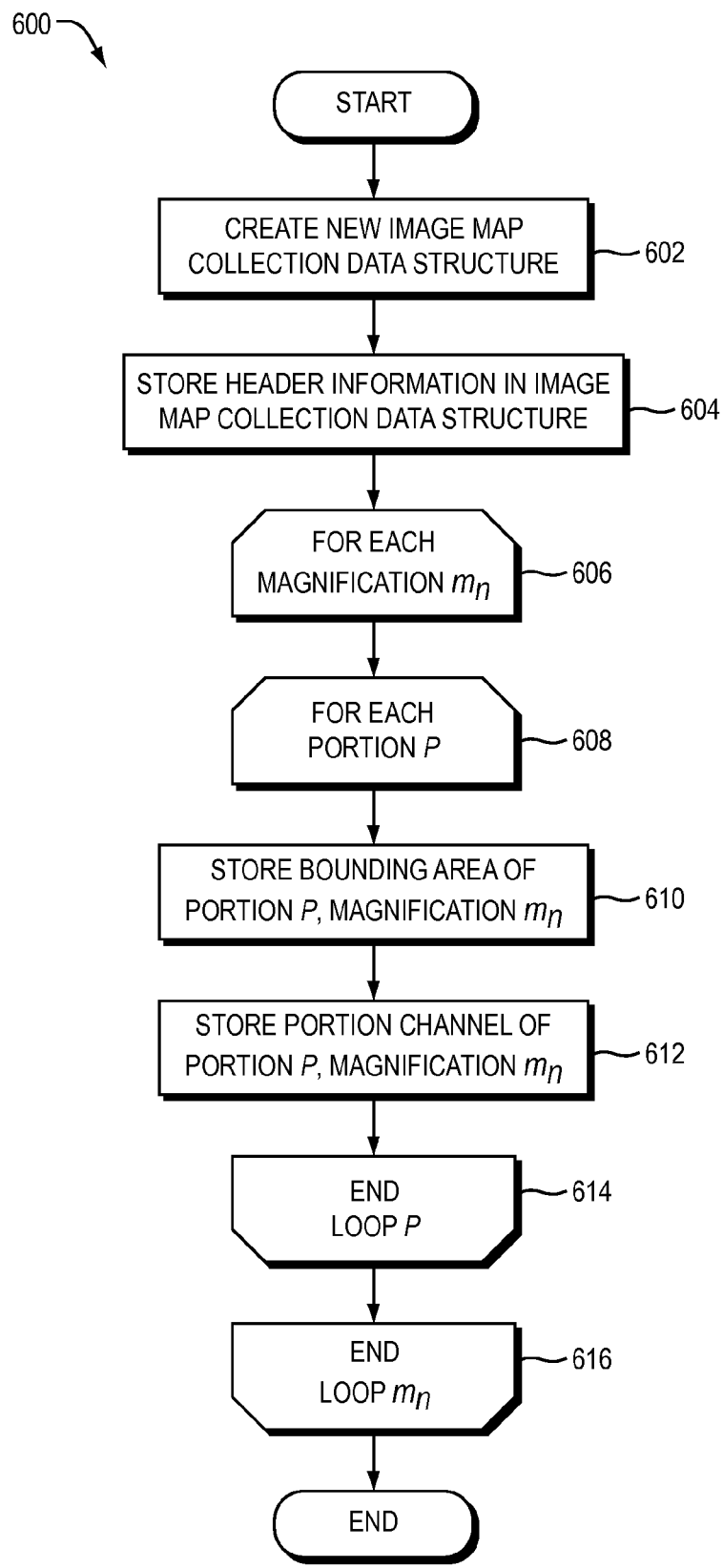
FIG. 6 is a flowchart of a method performed by the system of FIG. 5 according to one embodiment of the present invention.

As described above, the image map collection data structure 114 may contain one or more image map data structures, each of which corresponds to a particular magnification. The image map collection 114 may, for example, be stored in a single file, which may or may not contain the converted image 122 itself. Examples of techniques for creating the image map collection data structure 114 will now be described in more detail with reference to the dataflow diagram of FIG. 5 and corresponding flowchart of FIG. 6. For ease of illustration, FIG. 5 shows only those portions of the image map collection creator 112 which are relevant to the method 600 illustrated in FIG. 6. Those having ordinary skill in the art will appreciate how to combine the teachings of FIGS. 5 and 6 with the teachings of the previous figures. In particular, FIGS. 5 and 6 only illustrate processing that may be performed for a single magnification. The same techniques may be applied to all desired magnifications.

The image map collection creator 112 creates a new image map collection data structure 114 (FIG. 6, 602), such as by creating a new file to store the image map collection. A header generator 502 generates and stores header information 504 in the image map collection 114, such as the file name of the file that stores the image 104, the width and height of the image 104, the resolution of the image 104, the number of magnifications M, and the number of portions 110 (step 604).

The image map collection creator 112 enters a loop over each magnification $m_n$ (step 606), and for each portion P within each magnification (step 608). A portion processor 506 appends or otherwise stores the bounding area 508 of the current portion P in the image map collection 114, such as by storing the coordinates of the bounding area's vertices in the image map collection 114 (step 610).

The portion processor 506 then appends or otherwise stores the portion channel 510 for portion P in the image map collection 114 (step 612). The portion processor 506 may perform certain processing on the portion channel 510 before storing it in the image map collection 114. For example, the portion processor 506 may combine the pixels in the portion channel that fall within the portion channel's bounding area into consecutive bytes, without any padding bits, starting from the upper left of the portion channel's bounding area and proceeding left to right through each consecutive row.

Such binarization of the portion channels 306 may, for example, be performed as follows. Recall that each pixel in each of the portion channels 306 is either active or inactive. Each such pixel may be represented in the portion channels 306 using any number of bits, e.g., 1, 2, 4, 8, 16, or 32. However, regardless of the number of bits used to represent each such pixel, each such pixel only represents one bit of information: active or inactive. As a result, each pixel in a portion channel may be converted into a single bit indicating whether the pixel is active or inactive (using values such as 255 for active and 0 for inactive, for example). Consecutive bits (corresponding to consecutive pixels) may be combined into bytes. For example, the first eight pixels in a portion channel may be converted into eight bits, which may be stored in a single byte. The next eight pixels in the portion channel may be converted to a second byte, which may be stored consecutively after the first byte. If the end of a row of pixels is reached before filling the current byte, then the current byte may be completed with the bits representing the initial pixels of the following row. If, upon completion of binarization of a portion channel, the final byte does not include eight bits, the final byte may be padded with zeroes.

Such an approach binarizes the portion channel to reduce the space require to store it. The resulting binarized portion channel may be stored in formats, such as binary, hexadecimal digits, or any byte format.

Steps 610-612 may be repeated for each remaining portion P in the current magnification (step 614). Steps 608-614 may be repeated for each remaining magnification (step 616). Upon completion of the method 600 shown in FIG. 6, the image map collection includes the header information 504, as well as the bounding area information 508 and binarized, compressed portion channels 510 for each portion (hotspot) within each magnification of the image 104.

Additional compression may be achieved in a variety of ways. For example, if a particular portion is a rectangular area in which all pixels are active, or in which all pixels are inactive, then the portion channel itself need not be stored within the image map collection 114. Instead, if all pixels within the portion are active, then all that need be stored within the image map collection 114 is the bounding area of the portion and a flag indicating that the corresponding portion is a uniform active rectangular area. If all pixels within the portion are inactive, then all that need be stored within the image map collection 114 is a flag indicating that the corresponding portion is inactive.

Once the image map collection 114 has been created (or sooner), any one or more of the following may be performed, in any combination. The image map collection 114 may be encoded as text for HTTP transmission. The image map collection 114 may be compressed using a format such as gzip, either instead of or in addition to compressing the individual portion channels 510. The portion channels 510 may be encoded as text for HTTP transmission. The portion channels 510 may be compressed using a format such as gzip.

Figure 7:
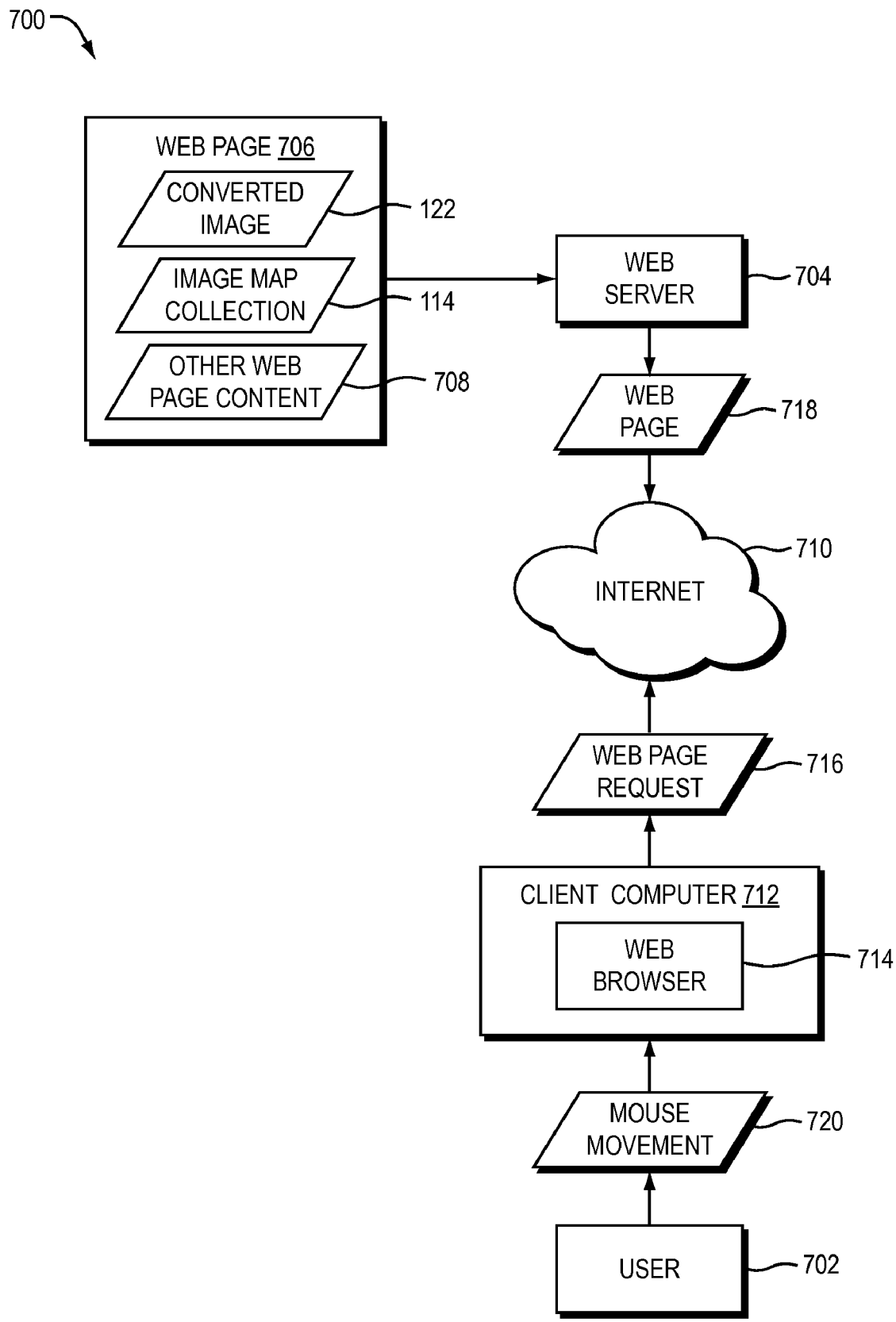
FIG. 7 is a dataflow diagram of a system for enabling the use of hotspots by a user according to one embodiment of the present invention.
Figure 8:
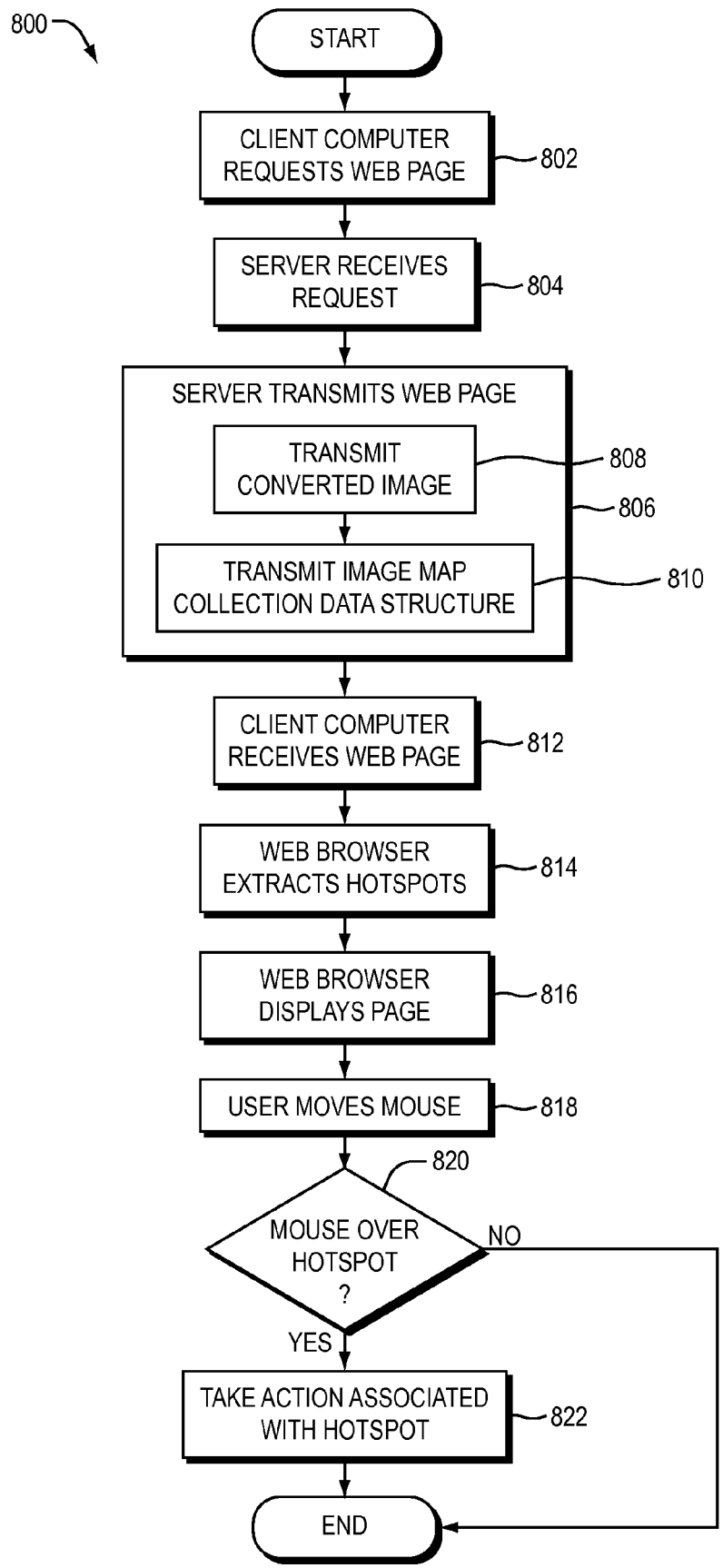
FIG. 8 is a flowchart of a method performed by the system of FIG. 7 according to one embodiment of the present invention.

Once the image map collection 114 has been created, it may be used to enable a user to view the image 104 (or the converted image 122) at any magnification and to activate the hotspots within the image 104 to view additional content or trigger other actions. Referring to FIG. 7, a dataflow diagram is shown of a system 700 for enabling such use of hotspots by an end user 702. Referring to FIG. 8, a flowchart is shown of a method 800 performed by the system 700 of FIG. 7 according to one embodiment of the present invention.

In the embodiment shown in FIG. 7, the user 702 operates a client computer 712, which may be any computer or other device capable of interacting over a network using TCP/IP. The client computer 712 includes a web browser 714 for browsing pages on the World Wide Web. Although in the example illustrated in FIGS. 7 and 8 involves web pages, the same or similar techniques may be applied to using hotspots in conjunction with other kinds of Internet services, and even in connection with software executing on a standalone computer or otherwise not interacting with a network.

The client computer 712 issues a request 716 over the Internet 710 to retrieve a particular web page 706 from a web server 704 (FIG. 8, step 802). The request 716 may be issued, for example, in response to the user 702 clicking on a link to the web page 706 or in response to the user 702 typing the URL of the web page 706 into the address bar of the web browser 714.

The web server 704 receives the request 716 (step 804) and, in response, serves the web page 718 over the Internet 710 to the web browser 714 (step 806). As shown in FIG. 7, the web page 706 includes the converted image 122, the image map collection data structure 114, and other web page content 708 (such as text and/or graphics intended to be displayed on the same page as the converted image 122). Therefore, in the process of transmitting the web page 718 to the client computer 712, the web server 704 transmits the converted image 122 (step 808) and the image map collection data structure 114 (step 810) to the client computer 712, which receives the web page 718 (step 812). Note that the converted image 122 transmitted to the web browser 714 may be the largest of all magnifications which the web browser 714 may display.

Note that the entire web page 718 need not be transmitted in one pass to the client computer 712. Instead, the web page 718 may be transmitted in stages. For example, at first the web server 704 may transmit only a skeleton of the web page 718 which includes information such as the number of images on the page 718 and how the images are laid out on the page. In response, the web browser 714 may request additional information from the server, such as requesting the first image in the web page 706. In response, the server 704 may send the converted image 122 and the image map for the default magnification (i.e., 1.0) of the image 122.

The web browser 714 may decompress the image map at the client computer 712, thereby minimizing the use of network bandwidth to transmit the image map. The web browser 714 extracts information from the image map, such as the number of magnifications, and the bounding areas and portion channels of all hotspots in the default image map and/or any other image maps transmitted to the client computer 712 (step 814). The extracted information may be stored in any format, such as data structures in the form of arrays in the memory of the client computer 712. These and other functions described herein as being performed by the web browser 714 may be performed, for example, by JavaScript or other code contained within the web page 718 and executing within the web browser 714 or otherwise executing on the client computer 712.

The web browser 714 renders the web page 718, including the image 122, at a particular magnification to produce a rendering of the web page 718 on a display of the client computer 712 (step 816). The user's movement of the mouse causes mouse movement input 720 to be provided to the client computer 712 (step 818). The method 800 of FIG. 8 determines whether the current location of the user's mouse pointer is over any hotspot in the image map corresponding to the current magnification of the converted image 122 (step 820). Such an occurrence is known as a "hover" event. If such a hover event occurs, the web browser 714 takes a predetermined action associated with the particular hotspot over which the user's mouse is hovering (step 822). The predetermined action may, for example, be displaying a pop-out or pop-up window associated with the hotspot, or following a hyperlink associated with the hotspot to a local or remote network resource associated with the hotspot. The user 702 may then hover over and/or click on other hotspots in the image 122 to cause other predetermined actions to be taken.

A predetermined action may be associated with a hotspot in any of a variety of ways. For example, a database may store information linking each hotspot to a corresponding action. Such a database may associate additional information with each hotspot, such as a name of the object represented by the hotspot, a SKU (stock-keeping unit) associated with the object, and a price of the object. These particular pieces of information are merely examples and do not constitute limitations of the present invention. Furthermore, a hotspot may be associated with more than one action. For example, a hotspot may be associated with a first action to be taken in response to the user hovering over the hotspot, and a second action to be taken in response to the user clicking on the hotspot. The database, or other source of information linking hotspots to actions, may, for example, be stored within the image map collection 114 or elsewhere within the web page 706.

The method 800 may determine whether the user's mouse is hovering over a hotspot within the image 122 in any of a variety of ways. For example, each time the user's mouse moves, the method 800 may determine whether the user's mouse pointer is within any of the bounding areas defined by the bounding area information for the current image map. If the user's mouse pointer is not within any such bounding area, the method 800 need not take any further action.

If the user's mouse pointer is within a bounding area associated with the current image map, the method 800 uses the portion channel information associated with that bounding area to determine whether the particular pixel underneath the mouse pointer is an active pixel. If the mouse pointer is determined to be over an active pixel by reference to the portion channel information, then the method 800 determines that the user 702 is hovering over the hotspot associated with the portion channel.

If the user 702 changes the displayed magnification of the converted image 122 (such as by changing the displayed magnification of the web page 718 or by changing the displayed magnification of the converted image 122 within the web page 718), the server 704 may transmit a version of the image 122 at the correct magnification to the web browser 714, which will display the scaled image to the user 702. Note, however, that transmission of a resized image by the server 704 to the web browser 714 is not required. Alternatively, for example, the web browser 714 may resize the original converted image 122 for display at the new magnification without downloading any new image data from the server 704, and then display the scaled image to the user 702.

Regardless of how the converted image 122 is scaled, the web browser 714 may then retrieve the image map for the current magnification from the server 704 (if that image map was not previously downloaded by the web browser 714) and then begin to use the new image map data within the method 800.

As the user 702 zooms in and out of the image, the entire scaled image may or may not be displayed. If the entire image is displayed as its scale changes, then the screen area occupied by the scaled image changes as its scale changes. Alternatively, for example, the scaled image may be displayed within a fixed-size viewport, in which case only a portion of the scaled image may be displayed within the viewport if the scaled image is larger than the viewport.

In the embodiments described above, separate image maps are stored in the image map collection 114, one image map per magnification. This is merely an example and does not constitute a limitation of the present invention. For example, the image map collection 114 may contain only a single image map which is used for multiple magnifications.

For example, the (x,y) coordinates of the user's mouse may be retrieved as relative coordinates such as (0.5, 0.5), representing the center of the image, rather than as absolute coordinates such as (300, 200). Such relative coordinates may be converted into absolute coordinates by multiplying the relative coordinates by the dimensions of the current image magnification. A reverse transform may be applied to such coordinates to find the pixel location within the current image, depending on the current magnification level of the image. For example, assume that the current image map in use by the web browser 714 was created for the converted image 122 at a magnification of 1.0, and that the converted image 122 is currently being displayed by the web browser 714 at a 0.75 magnification. As the user's mouse moves over the scaled image, the 0.25 reduction transform may be reversed to identify the current coordinates of the mouse within the original (e.g., magnification of 1.0) image. If the current image map was created for a different magnification, such as 0.8, then the reverse transform would reverse the 0.05 reduction to identify the mouse coordinates within the original (e.g., magnification of 0.8) image. The portion channel information may then be used to determine whether the coordinates resulting from the reverse transform correspond to an active pixel.

Among the advantages of the invention are one or more of the following.

One advantage of embodiments of the present invention is that they enable image map designers to create image maps quickly and easily, even when hotspots within the image map are irregularly-shaped. For example, the designer may use any of a variety of image selection tools, such as a "magic wand" tool found in commonly-available image processing software, to select objects within an image even when such objects do not have the shape of a polygon or ellipse. Creation of hotspots in this manner can be much quicker and easier than attempting to create irregularly-shaped hotspots out of polygons and ellipses.

Furthermore, embodiments of the present invention allow a single hotspot to contain non-contiguous regions. Such hotspots are useful, for example, to represent a group of objects (such as a group of lamps in an image of a room) using a single hotspot. More generally, embodiments of the present invention enable any subset of pixels in an image to be defined as a hotspot. One benefit of this flexibility is that even very thin regions of an image, such as a line having a width of a single pixel, may be defined as hotspots. A hotspot may even consist of a single pixel, or a collection of individual non-contiguous pixels.

Such pixel-level accuracy is difficult to achieve using polygon-based image map areas. This is particularly true for irregularly-shaped objects. When drawing the polygon, the line segments tend to jump across a single pixel when the pixel is jetting out. An additional polygon image map area is required to identify the one pixel or pixels that were jumped over.

Another disadvantage of polygon-based image maps that is avoided by embodiments of the present invention is that polygon-based image map areas must be loaded into a browser in the correct order, particularly when one image map area is enclosed within another (e.g., a small square within a larger square). If not loaded in the correct order, the inner area will not be active, and the large area will be active over the small area.

Whether using circles, rectangles, or polygons, if the image is resized, the entire set of image maps areas must be manually redrawn to the new image size. This restricts the ability to repurpose the same image at various display sizes for thumbnail viewing or zoom-level magnifications. There are ActiveX solutions for the resizing images with hypersensitive areas, but this requires licensing and the end user to install the ActiveX application. Installing applications outside of the web browser are often subject to security policies or personal security preferences. Such problems are avoided by embodiments of the present invention.

Another advantage of embodiments of the present invention is that the image map designer may create a single set of hotspots for a single image at a single magnification, in response to which multiple scaled versions of the image map may be created automatically for use with the image when displayed at multiple different magnifications. This feature enables the image map to remain accurate and useful even when the image is displayed at different magnifications, but without requiring the image map designer to manually create different versions of the image map for use with different image magnifications. In contrast, conventional polygon-based image maps tend to lose accuracy when they are automatically scaled for use with different image magnifications.

Furthermore, only a single magnification (such as the highest-resolution magnification) of the image need be transmitted to the client. The client may then scale the image to the desired magnification for viewing. This reduces bandwidth requirements in comparison with techniques which require a separate image for each magnification to be transmitted to the client.

The techniques disclosed herein are generally applicable to any web browser and any platform. They do not require the installation of web browser plug-ins, web browser extensions, or ActiveX components, thereby reducing the load on the client and automating the process of implementing image maps on the client. Furthermore, they are not limited to use with web browsers, but rather may be used to implement image maps in any kind of software.

The techniques disclosed herein are not limited to taking actions in response to the user hovering over or selecting a hotspot. For example, the techniques disclosed herein may be used to navigate to a specific hotspot within an image. In particular, any particular hotspot may be navigated to using the coordinates of the bounding area of the hotspot and the coordinates of the first active pixel within the bounds. For example, if the user desires to view a particular product within an image, the user may select the name of the product from a drop-down menu or using a voice command, in response to which the web browser may move the location of the rendered image so that the selected product is displayed in the center of the viewing area.

The techniques disclosed herein for applying an image map to an image at multiple magnifications is particularly well-suited for deployment on mobile phones and other mobile computing devices having small displays. The full-sized image intended for display on a desktop computer monitor may be resized for such small displays, and the automatically-generated scaled image maps may be used to implement the image map on the small display without loss of accuracy.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Image maps may be implemented either on the client side (i.e., on the user's local machine 712 in FIG. 7) or on the server side (i.e., at the web server 704 in FIG. 7). Embodiments of the present invention may be implemented in connection with either client side image maps or server side image maps. With a client-side image map, the user's local machine determines whether the user's mouse is over a hotspot; with a server-side image map, the user's mouse pointer location is transmitted to the server, which determines whether the user's mouse is over a hotspot and then transmits a message to the client indicating whether the user's mouse is over a hotspot.

Although for ease of explanation the web page 706 in FIG. 7 is shown as containing only a single image 122, the web page 706 may contain multiple images and image map collection information for each such image. Furthermore, the techniques disclosed herein are not limited to use only with images. For example, the techniques disclosed herein may be used to treat the entire content of a display screen or window (such as a window of a web browser) as an image containing hotspots within it.

The image map collection data structure 114 may take any of a variety of forms. For example, it may be implemented as one or more files stored in a file system, as one or more databases or database records stored in a database system, or as a data structure stored in RAM or other memory.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method comprising:
   (A) receiving a first instruction from a first user to select a first portion of a first digital image, the first digital image comprising a plurality of pixels;
   (B) in response to the first instruction, selecting a first subset of the plurality of pixels in the first digital image;
   (C) storing a record of the first subset in an image map collection data structure, wherein the record contains: (1) data representing the first subset as at least one of a list of pixels and an array of pixels, (2) data representing pixels in the plurality of pixels other than the first subset, and (3) data representing a bounding area containing the first subset and the pixels other than the first subset;
   (D) transmitting the image map collection data structure and the first digital image to a client;
   (E) identifying a current location of a user cursor within a rendering of the first digital image at the client;
   (F) determining whether the current location is within the first subset based on the data representing the bounding area; and
   (G) if the current location is within the first subset, taking a first predetermined action associated with the first subset.

2. The method of claim 1, wherein (A) comprises receiving a first instruction from a first user to select an object, wherein the first instruction does not specify the shape of the object, and wherein (B) comprises selecting the first subset by applying a predetermined function to the first instruction.

3. The method of claim 1, wherein the first subset consists of a single pixel.

4. The method of claim 1, wherein the first subset comprises non-contiguous sets of pixels.

5. The method of claim 1, wherein the first predetermined action comprises following a hyperlink to a resource associated with the first subset.

6. The method of claim 1, further comprising:
   (H) receiving a second instruction from the first user to select a second portion of the first digital image;
   (I) in response to the second instruction, selecting a second subset of the plurality of pixels in the first digital image;
   (J) storing a record of the second subset in the image map collection data structure;
   (K) determining whether the current location is within the second subset; and
   (L) if the current location is within the second subset, taking a second predetermined action associated with the second subset.

7. The method of claim 1, wherein (F) comprises:
   (F)(1) transmitting the current location to a server;
   (F)(2) at the server, determining whether the current location is within the first subset; and
   (F)(3) at the server, transmitting to the client a message indicating whether the current location is within the first subset.

8. The method of claim 1, wherein (C) comprises:
   (C)(1) storing the record of the first subset in a first image map in the image map collection data structure;
   (C)(2) storing a record of a scaled version of the first subset in a second image map in the image map collection data structure.

9. The method of claim 8, further comprising:
   (H) before (E), scaling the first digital image to produce a scaled digital image;
   wherein (E) comprises identifying a current location of a user cursor within a rendering of the scaled digital image at the client; and
   wherein (F) comprises determining whether the current location is within the first subset by reference to the scaled version of the first subset.

10. The method of claim 1, wherein (E) comprises identifying a current relative location of the user cursor within the rendering, and where (F) comprises:
    (F)(1) identifying a current display magnification of the first digital image at the client; and
    (F)(2) determining whether the user cursor is within the rendering based on the current relative location and the current display magnification.

11. The method of claim 1, further comprising:
    (H) resizing the first digital image at a particular magnification to produce a resized digital image; and
    (I) automatically generating, from the image map collection data structure, a scaled image map collection data structure for use with the resized digital image.

12. The method of claim 1, wherein (F) comprises:
(F)(1) determining whether the current location is within the bounding area; and
(F)(2) determining that the current location is not within the first subset if the current location is not within the bounding area.

13. The method of claim 12, wherein (F) further comprises:
(F)(3) if the current location is determined to be within the bounding area, then:
  (F)(3)(a) identifying a pixel at the current location; and
  (F)(3)(b) determining that the current location is within the first subset only if the pixel at the current location is within the at least one of the list of pixels and the array of pixels.

14. An apparatus comprising:
means for receiving a first instruction from a first user to select a first portion of a first digital image, the first digital image comprising a plurality of pixels;
means, responsive to the first instruction, for selecting a first subset of the plurality of pixels in the first digital image;
means for storing a record of the first subset in an image map collection data structure, wherein the record contains: (1) data representing the first subset as at least one of a list of pixels and an array of pixels, (2) data representing pixels in the plurality of pixels other than the first subset, and (3) data representing a bounding area containing the first subset and the pixels other than the first subset;
means for transmitting the image map collection data structure and the first digital image to a client;
means for identifying a current location of a user cursor within a rendering of the first digital image at the client;
means for determining whether the current location is within the first subset based on the data representing the bounding area; and
means for taking a first predetermined action associated with the first subset if the current location is within the first subset.

15. The apparatus of claim 14, further comprising:
means for resizing the first digital image at a particular magnification to produce a resized digital image; and
means for automatically generating, from the image map collection data structure, a scaled image map collection data structure for use with the resized digital image.

16. The apparatus of claim 14, wherein the means for determining whether the current location is within the first subset comprises:
means for determining whether the current location is within the bounding area; and
means for determining that the current location is not within the first subset if the current location is not within the bounding area.

17. The apparatus of claim 16, wherein the means for determining whether the current location is within the first subset further comprises:
means for identifying a pixel at the current location if the current location is determined to be within the bounding area; and
means for determining that the current location is within the first subset only if the pixel at the current location is within the at least one of the list of pixels and the array of pixels.

18. A computer-implemented method performed by a client device, the method comprising:
(A) receiving an image map collection data structure and a first digital image;
(B) identifying a current location of a user cursor within a rendering of the first digital image at the client;
(C) reading, from the image map collection data structure, a record containing: (1) data representing a first subset of the first digital image as at least one of a list of pixels and an array of pixels; (2) data representing pixels in the plurality of pixels other than the first subset; and (3) data representing a bounding area containing the first subset and the pixels other than the first subset;
(D) determining whether the current location is within the first subset based on the data representing the bounding area; and
(E) if the current location is within the first subset, taking a first predetermined action associated with the first subset.

19. The method of claim 18, further comprising:
(F) resizing the first digital image at a particular magnification to produce a resized digital image;
(G) automatically generating, from the image map collection data structure, a scaled image map collection data structure for use with the resized digital image.

20. An apparatus comprising:
means for receiving an image map collection data structure and a first digital image;
means for identifying a current location of a user cursor within a rendering of the first digital image at a client device;
means for reading, from the image map collection data structure, a record containing: (1) data representing a first subset of the first digital image as at least one of a list of pixels and an array of pixels; (2) data representing pixels in the plurality of pixels other than the first subset; and (3) data representing a bounding area containing the first subset and the pixels other than the first subset;
means for determining whether the current location is within the first subset based on the data representing the bounding area; and
means for taking a first predetermined action associated with the first subset if the current location is within the first subset.

21. The apparatus of claim 20, further comprising:
means for resizing the first digital image at a particular magnification to produce a resized digital image; and
means for automatically generating, from the image map collection data structure, a scaled image map collection data structure for use with the resized digital image.

22. A computer-implemented method performed by a client device, the method comprising:
(A) receiving an image map collection data structure and a first digital image, wherein the image map collection data structure contains: (1) data representing a first subset of the first digital image as at least one of a list of pixels and an array of pixels; (2) data representing pixels in the plurality of pixels other than the first subset; and (3) data representing a bounding area containing the first subset and the pixels other than the first subset;
(B) scaling the first digital image to produce a scaled digital image;
(C) identifying a current location of a user cursor within a rendering of the scaled digital image;
(D) identifying a first subset of the scaled digital image;
(E) determining whether the current location is within the first subset based on the data representing the bounding area; and
(F) if the current location is within the first subset, taking a first predetermined action associated with the first subset.

23. An apparatus comprising:

means for receiving an image map collection data structure and a first digital image, wherein the image map collection data structure contains: (1) data representing a first subset of the first digital image as at least one of a list of pixels and an array of pixels; (2) data representing pixels in the plurality of pixels other than the first subset; and (3) data representing a bounding area containing the first subset and the pixels other than the first subset;

means for scaling the first digital image to produce a scaled digital image;

means for identifying a current location of a user cursor within a rendering of the scaled digital image;

means for identifying a first subset of the scaled digital image;

means for determining whether the current location is within the first subset based on the data representing the bounding area; and means for taking a first predetermined action associated with the first subset if the current location is within the first subset.

* * * * *